July 17, 1962 G. G. SCARROTT ETAL 3,044,593
FRICTIONAL COUPLING DEVICES
Filed Sept. 4, 1958 2 Sheets-Sheet 1

INVENTORS
GORDON G. SCARROTT
BRIAN G. WELBY
BY
Cameron, Kerkam & Sutton
ATTORNEYS July 17, 1962  G. G. SCARROTT ETAL  3,044,593
FRICTIONAL COUPLING DEVICES
Filed Sept. 4, 1958  2 Sheets-Sheet 2

INVENTORS
GORDON G. SCARROTT
BRIAN G. WELBY
BY Cameron, Kerkam + Sutton
ATTORNEYS & # United States Patent Office 3,044,593
Patented July 17, 1962

3,044,593
FRICTIONAL COUPLING DEVICES
Gordon George Scarrott, Manchester, and Brian Guy Welby, Sale, England, assignors to Ferranti, Limited, Hollinwood, England, a company of Great Britain and Northern Ireland
Filed Sept. 4, 1958, Ser. No. 758,933
Claims priority, application Great Britain Sept. 7, 1957
7 Claims. (Cl. 192—84)

This invention relates to frictional coupling devices for coupling a rotatable first member to a second member. The second member may also be rotatable, about an axis aligned with the axis of rotation of the first member, the clutch being then a transmission clutch. Alternatively, the second member may be fixed against rotation, the clutch acting then as a friction brake.

Where it is desired that the first member of a transmission clutch should be able to take up from the second member a very fast drive in a very short time under an appreciable load, difficulty is experienced in satisfying apparently incompatible design requirements. On the one hand it is necessary for the inertia of the first member to be reduced to a minimum to allow sufficient rapidity of acceleration; whereas on the other hand the first member must be strong enough to withstand the large forces required for the extremely rapid acceleration under load.

Similarly with a friction brake, where it is desired to arrest the first member from a rapid rotation with the minimum delay, the first member must again combine minimum inertia with maximum strength.

An object of the invention is to provide a friction clutch or brake in which this difficulty is to a large extent overcome.

A further object is to provide such a clutch or brake which allows great rapidity of operation.

In accordance with the present invention, a frictional coupling device is provided which includes a thin planar disc rotatable about the disc axis, the disc being flexible only in directions parallel to its axis, an electromagnet having at least two pole surfaces parallel to and facing one side of the disc, a co-operating armature having surfaces in registration with said pole surfaces each to each but parallel to and facing the other side of the disc, the armature being coupled to the magnet so as to be incapable of angular movement relative to the magnet about the disc axis, means for urging said pole and armature surfaces into light engagement with the respective sides of the disc, and means for energising the magnet, thereby causing said pole surfaces and said armature surfaces to be attracted towards one another to grip the disc firmly between them.

The expression "light engagement" should be understood to mean engagement at a pressure which is not substantially more than is necessary to maintain said surfaces in contact with the disc.

The magnet and armature may be laminated.

The disc may be of magnetic material, such as spring steel, whereby the airgaps in the magnetic circuit between the magnet and the armature are fully bridged by the disc.

The magnet may be arranged for rotation about an axis aligned with the disc axis, the device then being a transmission clutch, or the magnet may be fixed against rotation, the device then being a friction brake.

The disc may be splined and mounted on a splined shaft to allow free movement of the disc along part of the shaft whilst remaining rigid in rotation with the shaft.

In the accompanying drawings, wherein like reference characters indicate like parts throughout the several views.

Figure 1:
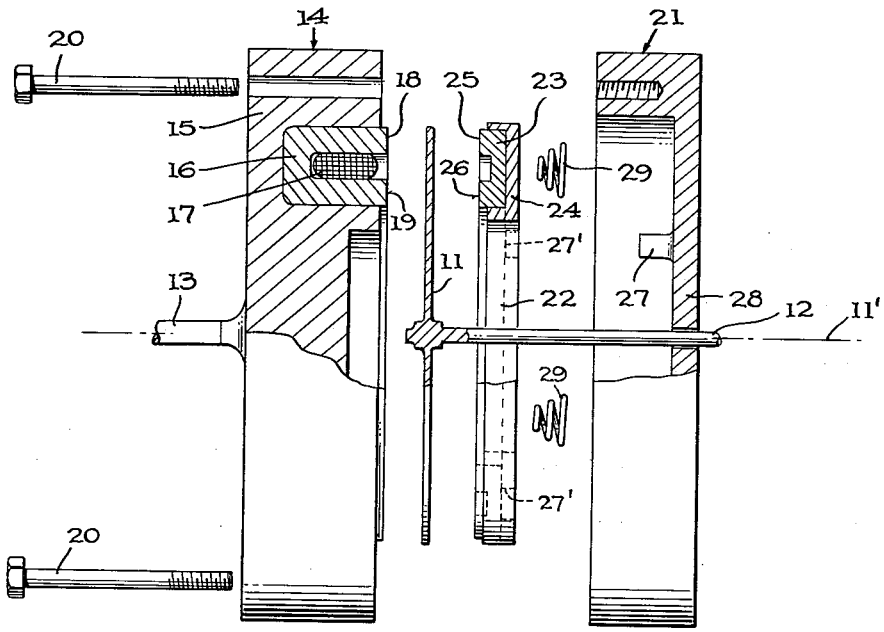
FIG. 1 is a part-sectional exploded view, simplified by the omission of the supporting structure and bearings, of a transmission clutch representing one embodiment of the invention.
Figure 2:
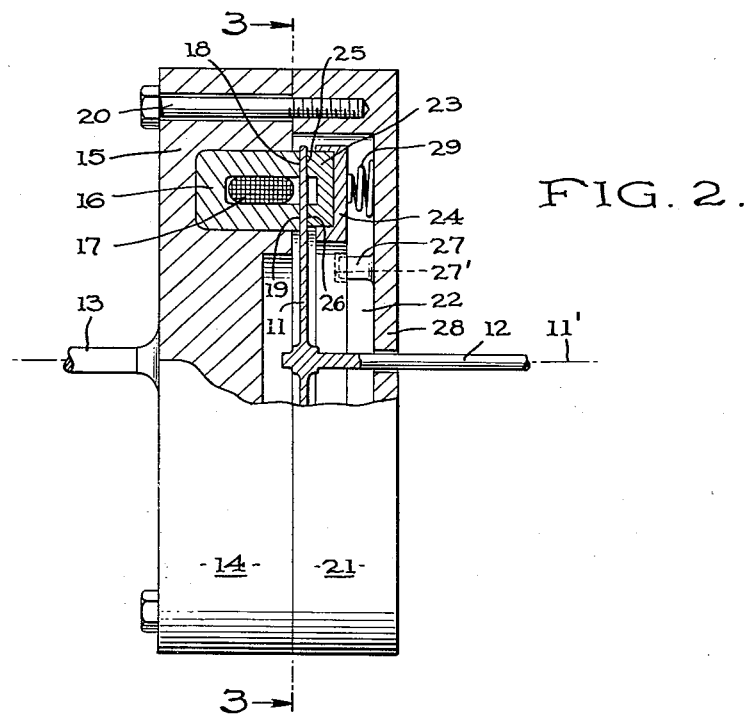
FIG. 2 is a part-sectional side view of the clutch of FIG. 1 in its normal assembled condition, taken on an axial plane through the magnet and armature laminations.
Figure 3:
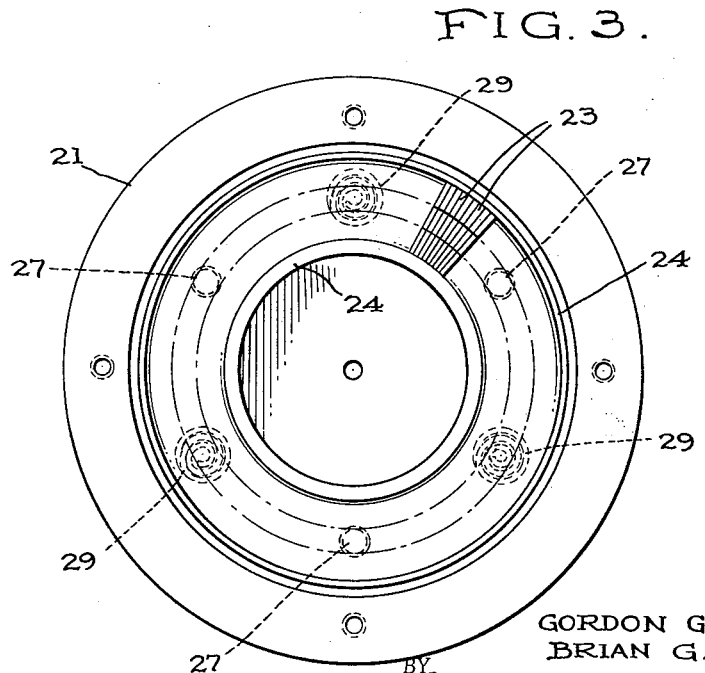
FIG. 3 is an end view of the right-hand portion of the clutch of FIGS. 1 and 2, taken from the line 3—3 in FIG. 2, with the rotatable disc and shaft removed.

In carrying out the invention in accordance with the embodiment of FIGS. 1–3, the transmission clutch includes as one of its two members (here the driven member) a very thin planar disc 11 of spring steel secured to the output shaft 12 for rotation about the disc axis $11^1$. By the expression "disc axis," as used throughout this specification and claims, is meant an axis passing through the centre of the disc normal to the plane of the disc. Being of spring steel the disc is naturally flexible in directions parallel to its axis but not in other directions. Shaft 12 is coupled to the load to be driven, which is not shown.

To the input shaft 13 of the clutch, which is of course in axial alignment with shaft 12, is secured one component 14 of the second member of the clutch, here the driving member. This component takes the form of a thick metal hub 15 having an annular recess facing disc 11 and containing an annular stack of rectangular U-shaped laminations 16 each of which is coplanar with the disc axis. Embedded in the laminations is an energising winding 17. The respective ends of the laminations combine to form annular coplanar surfaces 18 and 19 which face one side of disc 11 and are parallel to it.

By "annular" is meant circular with respect to the disc axis $11^1$ as a centre.

Secured peripherally to component 14 by bolts 20 is a second component 21 of the driving member. This also is in the form of a thick metal hub. Housed within the hub 21 for rotation therewith about the axis of disc 11 and shaft 12, but movable axially relative thereto, is an armature member 22 consisting of an annular stack of rectangular U-shape laminations 23, resembling laminations 16 but much shallower as no winding is enclosed and an annular shell 24, U-shaped in radial cross section, in which the laminations 23 are seated and by which they are supported. The free ends of the laminations form annular coplanar surfaces 25 and 26 facing disc 11.

As shown in the drawing, annular surfaces 18 and 19 face one side of the disc and are parallel to it and are respectively in registration with annular surfaces 25 and 26 facing and parallel to the other side of the disc.

It will be appreciated from the above description that the assembly of laminations 16 with winding 17 is in effect an electromagnet, with the assembly of laminations 23 as its armature. Between the pole surfaces 18 and 19 of the magnet and the co-operating surfaces 25 and 26 of the armature is sandwiched the disc 11.

Shell 24 of armature member 22 is mounted on and carried by three studs, one of which is shown at 27, secured to the web 28 of hub 21 (through which shaft 12 passes freely) and spaced equidistantly around axis $11^1$. Sockets $27^1$ formed in the web of shell 24 have a close sliding fit on these studs to allow the armature the necessary movement towards and away from the magnet whilst maintaining the armature rigid in rotation with the magnet when components 14 and 21 are bolted together; in other words, the armature is coupled to the magnet so as to be incapable of angular movement relative to the magnet about the disc axis. As will be indicated later, this coupling of the armature to the magnet provides the important advantage that the drive is applied to both sides of the disc. Three springs 29, also spaced equidistantly around the disc axis, in between the three studs, urge shell 24 and the contained laminations 23, constituting the armature, towards the magnet.

Connections to winding 17 are made by way of slip rings which are not shown.

The axial position of shaft 12 is such that in the unoperated or released condition of the clutch, with members 14 and 21 bolted together, springs 29 cause surfaces 18 and 19 and surfaces 25 and 26 to be urged into light engagement with the respective sides of the disc, the expression "light engagement" having the meaning defined above. The disc is flexible enough in directions parallel to its axis to take up axial inaccuracy in the assembly. The combined light pressure exerted by the four annular surfaces on the disc is insufficient for the resulting torque to rotate the load.

The clutch is operated or engaged by energising the winding 17. This causes pole surfaces 18 and 19 to attract armature surfaces 25 and 26, thereby gripping disc 11 firmly between said surfaces by a high degree of friction and so coupling shaft 12 to shaft 13 with sufficient force to drive the load.

The effect of the firm grip of the annular surfaces on the disc 11 when the clutch is energised is to reinforce the disc against axial movement and so impart considerable strength to the coupling despite the thinness of the disc. Part of the strength of the coupling is also due to the fact that, as already explained, the drive is applied to both faces of the disc. The requirement of small inertia combined with considerable effective strength is thus attained.

It will readily be appreciated that the efficiency of the electromagnetic operation is enhanced by the fact that there are no airgaps between the magnet and the armature, since each is always in engagement with the disc, which, being itself of magnetic material, fully bridges the gaps between them, thereby reducing to a low value the reluctance of the magnetic circuit and so correspondingly reducing the energising power required.

A further advantage of the invention is the extreme rapidity with which the clutch operates. This is due in part to the fact that the annular surfaces 18, 19, 25, and 26 are already in engagement with the disc before the clutch is operated; hence there is negligible delay due to the movement of mechanical parts when operation takes place.

The speed of operation is also due in part to the small inertia of the disc and to the fact that though the disc is flexible in directions parallel to its axis it is inflexible in directions in the plane of the disc. The speed is still further enhanced by the use of laminations for the magnetic circuit, for this results in a very rapid build-up of the field each time the energising voltage is applied to winding 17. It has been found that a load of one horse power may be taken up in half a millisecond at 3000 r.p.m. by a clutch in accordance with the invention in which the disc 11 is only 2 inches in diameter.

Another advantage of the device of the present invention is that wear of the disc is automatically taken up.

Disc 11, instead of being secured to shaft 12, may be mounted on it to allow free movement of the disc along part of the shaft whilst remaining rigid in rotation with the shaft. This may be effected by splining the disc and the end of shaft 12 in the usual way.

Figure 4:
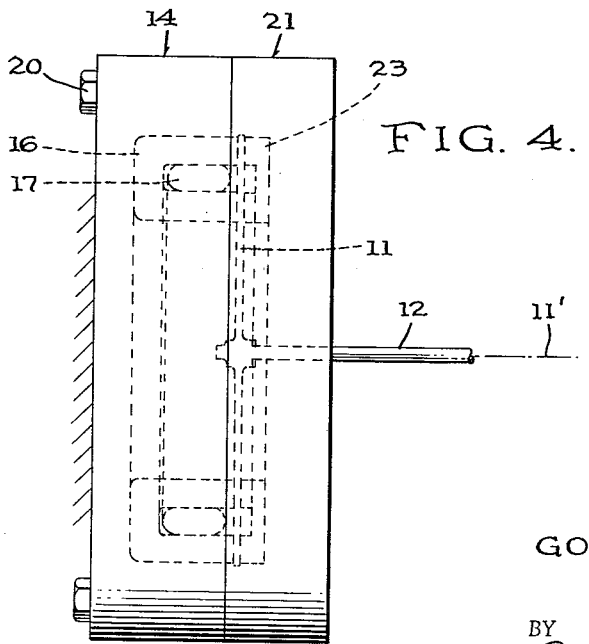
FIG. 4 is a side view of a modified form of the invention adapted to serve as a friction brake.

In the embodiment illustrated in FIG. 4, the second member, comprising hub components 14 and 21 carrying the magnet laminations 16 and winding 17 and the armature laminations 23, is fixed against roation, instead of being mounted for rotation as described above, the arrangement being now a friction brake. Except that in operation the disc 11 is rotating at a high speed and becomes arrested when the winding 17 is energised, and that the light engagement between the magnet and armature on the one hand, and the disc on the other hand, is insufficient to arrest the disc when the magnet is unenergised, the manner and principle of operation are the same as before.

A combination of a transmission clutch and a friction brake, each in accordance with the invention, is a convenient arrangement where it is desired that some device to be driven, such as the capstan of a tape reader for a computer, shall be alternately rotated and arrested at high speeds of response. The clutches are combined so that the two discs are mounted on a common shaft, which also carries the device to be rotated. A particular advantage of this arrangement arises from the fact that when neither device is energised the slight torque set up in the transmission disc due to the light engagement with it of the magnet and armature acts oppositely to the slight arresting torque correspondingly set up in the braking device. Hence, provided these torques are substantially equal, neither has any influence on the driven device.

What we claim is:

1. A frictional coupling device including a rotatable shaft, a thin planar disc mounted on said shaft for rotation therewith about an axis passing through the centre of the disc normal to the plane thereof, the disc being flexible only in directions parallel to its axis, a member to which said shaft is adapted to be frictionally coupled having hub portions mounted on opposite sides of said disc and normally fixed to one another, an electromagnet carried by one of said hub portions and positioned at one side of said disc, said magnet comprising a circular assembly of U-shaped laminations each of which is coplanar with the disc axis, the respective ends of the laminations combining to form two annular magnet pole surfaces parallel to and facing said one side of the disc, said pole surfaces being concentric with and radially spaced relative to the disc axis, a co-operating armature carried by the other hub portion and positioned at the other side of the disc having annular surfaces parallel to and facing said other side of the disc in registration with said magnet pole surfaces, means for so connecting the armature to said other hub portion that the armature is movable relative to the magnet and to said other hub portion along the disc axis but incapable of angular movement relative to the magnet and to said other hub portion about said axis, means for energising the magnet to cause said pole surfaces and said armature surfaces to be attracted towards one another and to grip the disc firmly therebetween, and means for maintaining said pole surfaces and said armature surfaces in direct light engagement with the opposite sides of the disc when the magnet is unenergised.

2. A coupling device as claimed in claim 1 wherein the armature comprises a circular assembly of U-shaped laminations each of which is coplanar with the disc axis, the respective ends of the laminations combining to form the said annular surfaces of the armature.

3. A coupling device as claimed in claim 1 wherein the disc is of magnetic material, whereby the gaps in the magnetic circuit between the magnet pole surfaces and the co-operating armature surfaces are fully bridged by the disc.

4. A coupling device as claimed in claim 3 wherein the disc is of spring steel.

5. A coupling device as claimed in claim 1 including a splined connection between the disc and the shaft, whereby the disc is movable along part of the shaft whilst remaining rigid in rotation therewith.

6. A friction clutch including a rotatable shaft, a thin planar disc of spring steel carried by said shaft for rotation therewith about an axis passing through the centre of the disc normal to the plane thereof, a member mounted for rotation about an axis aligned with the disc axis to which said shaft is adapted to be frictionally coupled, said member having hub portions mounted on opposite sides of said disc and normally fixed to one another, an electromagnet carried by one of said hub portions and positioned at one side of said disc, said magnet comprising a circular assembly of U-shaped laminations each of which is coplanar with the disc axis, the respective ends of the laminations combining to form two annular coplanar magnet pole surfaces which are coaxial wtih the disc axis and which face and are parallel to said one side of the disc, a co-operating armature carried by the other hub portion and positioned at the other side of the disc, means for so connecting the armature to said other hub portion that the armature is rigid with the magnet and said other hub portion in rotation but movable relative thereto along the disc axis, said armature having two surfaces which are in registration with said magnet pole surfaces and which face and are parallel to said other side of the disc, means for energising the magnet to attract the armature and grip the disc firmly between the respective pole and armature surfaces, and resilient means maintaining said pole and armature surfaces in direct light engagement with the opposite sides of the disc when the magnet is unenergised.

7. A friction brake including a rotatable shaft, a thin planar disc of spring steel carried by said shaft for rotation therewith about an axis passing through the centre of the disc normal to the plane thereof, a stationary member to which said shaft is adapted to be frictionally coupled for braking purposes having non-rotatable hub portions mounted on opposite sides of said disc and normally fixed to one another, an electromagnet carried by one of said hub portions and positioned at one side of said disc, said magnet being fixed against rotation about the disc axis and comprising a circular assembly of U-shaped laminations each of which is coplanar with the disc axis, the respective ends of the laminations combining to form two annular coplanar magnet pole surfaces which are co-axial with the disc axis and which face and are parallel to said one side of the disc, a co-operating armature carried by the other hub portion and positioned at the other side of the disc, means for so connecting the armature to said other hub portion that the armature is non-rotatable about the disc axis but is movable relative to the magnet and to said other hub portion along said axis, said armature having two surfaces which are in registration with said magnet pole surfaces and which face and are parallel to said other side of the disc, means for energising the magnet to attract the armature and grip the disc firmly between the respective pole and armature surfaces, and resilient means maintaining said pole and armature surfaces in direct light engagement with the opposite sides of the disc when the magnet is unenergised, said resilient means being so arranged that in the unenergised condition of the magnet said surfaces engage the disc with insufficient force to arrest the latter when rotated by said shaft.

References Cited in the file of this patent

UNITED STATES PATENTS

| | | |
|---|---|---|
| 2,315,298 | Thompson | Mar. 30, 1943 |
| 2,395,772 | Winther | Feb. 26, 1946 |
| 2,522,622 | Laurant | Sept. 19, 1950 |
| 2,664,981 | D'Ozouville | Jan. 5, 1954 |
| 2,690,819 | Meyer | Oct. 5, 1954 |
| 2,693,261 | Winther | Nov. 2, 1954 |
| 2,840,205 | Linke | June 24, 1958 |
| 2,876,879 | Maurice et al. | Mar. 10, 1959 |
| 2,876,880 | Cunningham | Mar. 10, 1959 |

OTHER REFERENCES

Magazine article on Floating Disc, page 128 of "Electrical World," October 8, 1949. (Copy in Div. 24.)